(12) United States Patent
Butterfield et al.

(10) Patent No.: US 7,259,857 B2
(45) Date of Patent: Aug. 21, 2007

(54) METHODS FOR AUTOMATED UNIFORMITY ASSESSMENT AND MODIFICATION OF IMAGE NON-UNIFORMITIES

(75) Inventors: Paul M. Butterfield, Ontario, NY (US); Joseph D. Hancock, Rochester, NY (US); Norman L. Roof, Jr., Palmyra, NY (US); Shawn P. Updegraff, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 580 days.

(21) Appl. No.: 10/756,396

(22) Filed: Jan. 14, 2004

(65) Prior Publication Data

US 2005/0151974 A1 Jul. 14, 2005

(51) Int. Cl.
*G01N 21/57* (2006.01)
*G01N 21/59* (2006.01)

(52) U.S. Cl. .................. 356/444; 356/402; 356/446; 347/19

(58) Field of Classification Search ................ 356/402, 356/407, 425, 443, 444, 446; 347/19
See application file for complete search history.

(56) References Cited

U.S. PATENT DOCUMENTS

| | | | |
|---|---|---|---|
| 5,369,494 A | 11/1994 | Bowden | |
| 5,416,613 A | 5/1995 | Rolleston | |
| 5,579,090 A * | 11/1996 | Sasanuma et al. | 399/49 |
| 5,946,006 A | 8/1999 | Tajika et al. | |
| 6,002,488 A | 12/1999 | Berg | |
| 6,126,264 A * | 10/2000 | Suzuki et al. | 347/19 |
| 6,150,062 A | 11/2000 | Sugizaki | |
| 6,366,362 B1 | 4/2002 | Butterfield | |
| 6,554,388 B1 * | 4/2003 | Wong et al. | 347/19 |
| 6,571,000 B1 | 5/2003 | Rasmussen | |
| 6,639,669 B2 | 10/2003 | Hubble, III | |
| 6,721,692 B2 | 4/2004 | Mestha | |
| 6,792,220 B2 | 9/2004 | Randall | |
| 2003/0071866 A1 | 4/2003 | Wong et al. | |

FOREIGN PATENT DOCUMENTS

| | | | |
|---|---|---|---|
| EP | 0 798 593 A2 | 10/1997 | |
| EP | 1 030 513 A2 | 8/2000 | |

* cited by examiner

*Primary Examiner*—Richard A. Rosenberger
(74) *Attorney, Agent, or Firm*—Oliff & Berridge, PLC

(57) ABSTRACT

Methods for automated uniformity assessment and modification of image non-uniformities using an image measurement device capable of determining image reflectance and/or transmitter as a function of position, such as a spectrophotometer, a calorimeter, and/or a densitometer. One or more of these devices scan an image on a substrate, such as a sheet, thereby generating data representing image characteristics, such as, for example, image non-uniformity. The sheet may contain a reference/test pattern including one column, strip or patch intended to have a uniform density. This data generated by the device after the scan of the substrate is analyzed with signal processing algorithms for image characteristics assessment, including image spatial uniformity and compared to reference image characteristics including image spatial uniformity. An image modification profile may be generated to be applied to a marking system to thereby alter subsequent image data and improve image spatial uniformity of the marking system.

6 Claims, 9 Drawing Sheets
(4 of 9 Drawing Sheet(s) Filed in Color)

FIG. 7
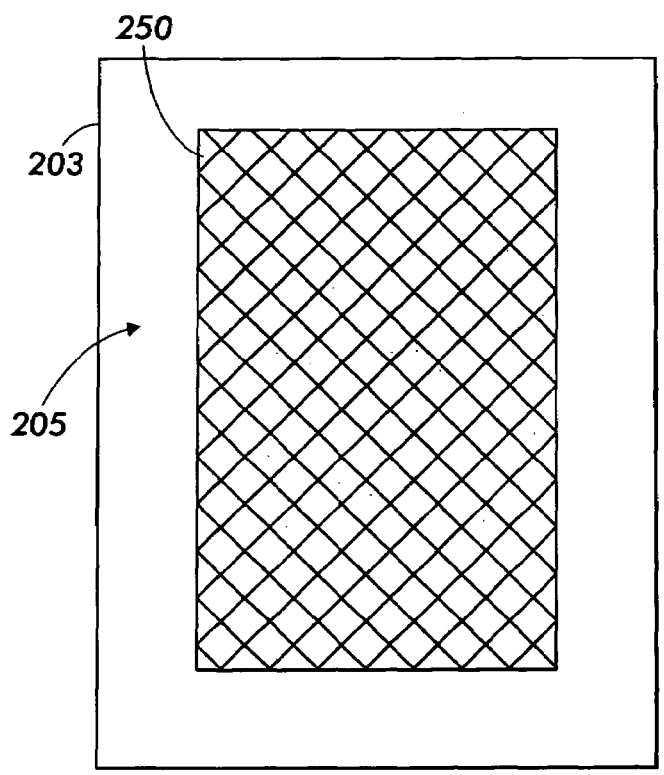
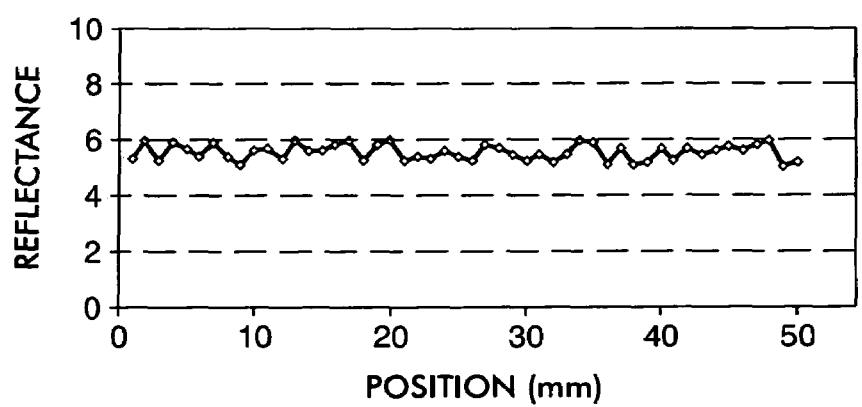
FIG. 8

METHODS FOR AUTOMATED UNIFORMITY ASSESSMENT AND MODIFICATION OF IMAGE NON-UNIFORMITIES

BACKGROUND OF THE INVENTION

1. Field of Invention

This invention relates to determining image characteristics.

2. Description of Related Art

In conventional marking systems, such as, for example, a laser printer, inkjet printer, or copier, one technique for monitoring the quality of prints is to create one or more "reference" or "test" patches of pre-determined desired tint. The reference/tint of a test patch may be referred to as the call or the density of the reference/test patch. The actual density of the material (often ink and/or toner) in each test patch can then be measured to determine the effectiveness of the printing process on marking a medium, such as for example, a sheet or reference strip. The uniformity of the image on the reference strip can then be determined.

There are many methods known in the art whereby reference/test patches may be used to monitor the quality of prints. For instance, U.S. Pat. No. 6,639,669 B2 to Hubble, the disclosure of which is incorporated herein by reference in its entirety, discloses a color analysis method in which reference strips, with multiple different color printed reference/test patches, are moved relative to a color analyzing spectrophotometer for analysis of test patches and an automatic diagnostic testing of the spectrophotometer. Similarly, U.S. Pat. No. 5,416,613 to Rolleston, the disclosure of which is incorporated herein by reference in its entirety, discloses a calibration arrangement for calibrating a color printer using a plurality of reference/test patches, a densitometer, and a means for converting device independent color information to printer colorant signals, using a look-up table stored in memory.

Likewise, pending U.S. patent application Ser. No. 10/248,390, the disclosure of which is incorporated herein by reference in its entirety, discloses a method and apparatus to calibrate a xerographic print engine toner concentration sensor to control the toner concentration to a specified operating target. This disclosure, includes determining the reflectivities of at least two reference/test patches formed at the same toner concentration, and combining the reflectivities to obtain a combined reflectivity for that toner concentration.

As such, a spectrophotometer, a colorimeter, or a densitometer is generally provided as a tool for evaluating tone reproduction curves and color quality of marking systems. These image measurement devices can measure light reflected from, or transmitted by an object, including an image. These devices use light transmitted and/or reflected by an image to measure the image quality of an image printed on a substrate.

A typical spectrophotometer gives color information in terms of measured reflectances or transmittances of light, at the different wavelengths of light, from the test surface. This spectrophotometer desirably provides distinct electric signals corresponding to the different levels of reflected light received from the respective different illumination wavelength ranges or channels.

Known devices capable of providing distinct electric signals corresponding to the different levels of reflected light received from the respective different illumination wavelength ranges or channels include for example, a portable spectrophotometer as disclosed in U.S. Pat. No. 6,002,488 the disclosure of which is incorporated herein by reference in its entirety.

As used herein, unless otherwise specifically indicated, the term "spectrophotometer" may encompass a spectrophotometer, calorimeter, and densitometer, as broadly defined herein. The definition or use of such above terms may vary or differ among various scientists and engineers. However, the following is an attempt to provide some simplified clarifications relating and distinguishing the respective terms "spectrophotometer," "calorimeter," and "densitometer," as they may be used in the specific context of the specification as examples of providing components for an on-line printer correction system, but not necessarily as claim limitations.

A "spectrophotometer" typically measures the reflectance of an illuminated object of interest over many light wavelengths. Typical prior spectrophotometers in this context use 16 or 32 channels measuring from about 380 nm to about 760 nm or so, to encompass the humanly visible color spectra or wavelength range. A typical spectrophotometer gives color information in terms of measured reflectances or transmittances of light, at the different wavelengths of light, from the test surface. A spectrophotometer desirably provides distinct electrical signals corresponding to the different levels of reflected light from the respective different illumination wavelength ranges or channels.

A "colorimeter" normally has three illumination channels, red, green and blue. That is, generally, a "calorimeter" provides its three (which may be three additive color primaries, such as, for example, red, green and blue or "RGB") values as read by a light sensor or photo detector receiving reflected or transmitted light from a color test surface illuminated with red, green and blue illuminators, such as three different color LEDs or one white light lamp with three different color filters. A "calorimeter" may thus be considered different from a "spectrophotometer," in that a colorimeter provides output color information in terms of tristimulus values, such as, for example, RGB and/or related trichromatic expressions, such as, for example, trichromatic coefficients based on tristimulus values. One example of a portable scanning colorimeter is disclosed in U.S. Pat. No. 5,369,494, the disclosure of which is hereby incorporated in its entirety.

Trichromatic quantities may be used for representing color in three coordinate space through some type of transformation. Other RGB conversions to "device independent color space" (i.e., RGB converted to conventional L*a*b*) typically use a color conversion transformation equation, a "lookup table", or recipe system in a known manner.

A "densitometer" typically has only a single channel, and simply measures the amplitude of light transmissivity and/or reflectivity from the test surface, such as a developed ink or toner test patch, on a photo detector, at a selected angle over a range of wavelengths, which may be wide or narrow. An illumination source, such as an IR LED, a visible LED, or an incandescent lamp, may be used. The output of the densitometer photo detector is programmed to give the optical density of the sample. A densitometer of this type is basically "color blind." For example, a cyan test patch and magenta test patch could have the same optical densities as seen by the densitometer, but, of course, exhibit different color spectra.

Thus, a spectrophotometer, a colorimeter, or a densitometer may be used as part of an image quality measurement and analysis system to determine image quality problems. These devices, include for example, the X-Rite® DTP41 automatic reference strip-reading spectrophotometer, have traditionally been used to assess raw engine tone reproduction curves, and build calibration look-up-tables, recipes and color profiles. These devices are often co-located with printing systems. Thus, an opportunity exists for extending the application of these devices beyond their traditional functionality.

Traditional use of these devices involves measuring discrete test patches to characterize print engine tonal and color response. For example, in various exemplary embodiments a predefined reference strip containing multiple test patches may be aligned with the device's measurement sensor, the start button pushed, the reference strip driven by the device's drive rollers powered by a motor through the reference strip entrance area of the device, and the reference strip scanned as the reference strip passes the scan area of the device. Measurement values for each reference/test patch may then be reported across a serial interface to a host computer.

It is known in the art that non-uniformity in the appearance of printed materials intended to be uniform is a persistent problem for marking technologies, such as direct-digital production color technologies. Thus, marking machines have inherent error manifesting itself in residual non-uniformities, even after all normal service actions, such as machine self-check diagnostics and technician implemented procedures, have been performed on a marking machine. These residual non-uniformities may occur, for instance, where an image to be printed is intended to be a specific uniform tone, but shows areas which are lighter or darker, or a different tone than other areas. These different areas of the same image are variations that were not intended when the image data was generated and do not reflect the image data generated.

It is known in the art that image quality metrics can be part of an overall image quality analysis engine. For instance, where a region of a printed image is intended to have a uniform color, but shows visible color variations or color differences with respect to the spatial nature of the non-uniformities, the image can be evaluated by a stand-alone scanner, a scanner associated with a printer or a digital camera. The results of the scan can be inputted into an image analysis module. The image analysis module can then quantify different types of non-uniformities and use this analysis to diagnosis printer problems.

For example, U.S. Pat. No. 6,571,000 to Rasmussen, the disclosure of which is incorporated herein by reference in its entirety, addresses the image quality problem relating to regions of a printed image, which was intended to have uniform color, but which show visible color variations. Rasmussen provides a way of evaluating absolute image quality with respect to uniformity, and using the results from the analysis as part of a system for machine diagnostics.

Image density of uniform chromatic and/or achromatic color areas, which may be characterized as image uniformity, is conventionally determined using a particular type of optical device. Image uniformity is conventionally determined using densitometers. On the other hand, image color characteristics are conventionally determined using different types of optical devices such as, for example, spectrophotometers (or spectroradiometers for determining light source color) and/or calorimeters.

For example, U.S. Pat. No. 5,369,494 to Bowden, the disclosure of which is incorporated herein by reference in its entirety, discloses a portable scanning colorimeter. Similarly, U.S. Pat. No. 6,002,488 to Berg, the disclosure of which is incorporated herein by reference in its entirety, discloses a compact spectrophotometer. Both of these patents are assigned to X-Rite®, Inc. Other X-Rite® products are also capable of determining color characteristics of printed materials at various locations on a print medium. For example, U.S. Pat. No. 6,150,062 to Sugizaki, the disclosure of which is incorporated herein by reference in its entirety, determines image density of solid image areas using an X-Rite® 404 densitometer manufactured by X-Rite, Ltd., whereas the color reproducibility is determined with a X-Rite® 968 Spectrophotometer, also manufactured by X-Rite, Ltd.

After data is generated by these devices the data may then be analyzed, applied to algorithms, or otherwise used to determine qualities of the area or image scanned. Pending U.S. patent application Ser. No. 09/941,858, the disclosure of which is incorporated herein by reference in its entirety, discloses methods and systems whereby a spectrophotometer uses an algorithm, based on spectral information of an illumination source and reference spectrophotometer, to convert integrated multiple illuminant measurements from a non-fully illuminant populated color sensor into a fully populated spectral curve using a reference database.

Similarly, U.S. Pat. No. 6,366,362 B1 to Butterfield, the disclosure of which is incorporated herein by reference in its entirety, discloses a procedure for detecting a signal from an device, such as a density photo detector, which monitors each of the individual colors (e.g. cyan, magenta, yellow and black) represented by test patches on a reference strip. After scanning a reference strip, when a particular color is determined to be running at a level above or below a predetermined bit density value, information obtained by the scanning operation is reviewed. When a specific bit pattern or state is detected a template matching process is undertaken, wherein a determination is made as to whether a template matching the scanned image bit pattern exists in storage. When such a template is found to exist, the appropriate template is used in place of a corresponding scanned image area in order to counteract the faulty operation of the printer.

The ability to assess and diagnose unwanted non-uniformity is a problem for field service personnel. Engineering tools such as microdensitometers, two-dimensional precision color scanners, digital cameras, flat bed cameras, and elaborate signal processing which may be available in the lab are generally unavailable to field service personnel who must use simpler and less capable tools. Generally, field personnel must use printed standard image references (SIR) and visual comparisons to determine whether a printing system meets its specified uniformity performance. Additional transparent overlays are placed on printed images to determine spatial frequencies of unwanted image bands. The processes are subjective and thus, have a tendency to be inaccurate.

SUMMARY OF THE INVENTION

The systems and methods of the present invention determine variations and spatial non-uniformities in images, including displayed and printed images.

Various embodiments of the systems and methods according to the invention include an image quality analysis module. In various exemplary embodiments, the image quality analysis module uses an automated image measurement device to assess the uniformity of the marking process by attempting to print a group, such as a column or row, of at least one test patch(es) intended to have a continuous uniform density and then measuring the density of each test patch with an image measurement device typically not used to measure image uniformity or image non-uniformity, such as, for example, a spectrophotometer, a densitometer and/or a calorimeter. In various exemplary embodiments of the invention, a computer uses the results of an image measurement device, such as a spectrophotometer, to determine image quality, including image spatial uniformity. In various exemplary embodiments of the invention, image non-uniformities and variations are quantified. Once image non-uniformities and/or variations are quantified, causes for those non-uniformities and/or variations can be determined and addressed. For instance, the quantified image non-uniformities and/or variations may be compared with acceptable values for such parameters based on human visual impressions of such non-uniformity or variation. Furthermore, specific non-uniformity and/or variation values may be a telltale sign that printer or copier elements needs correction. A compensation profile or other modification value may be applied to images to be printed in order to compensate for the marking system's non-uniformity.

The present invention provides reprogramming of one or more image measurement devices, such as through documented application program interfaces (API's), in order to supply document image uniformity measurements. For example, as discussed above, the traditional use of these devices, such as an X-Rite® DTP41 spectrophotometer, is to generate a signal based on an analysis of a reference strip in order to modify color recipes or look-up tables. Instead, the present invention uses the device to uniformly scan the entire image, such as pattern of reference/test patches on a reference strip or other image bearing substrate, produce an output based on the scan, determine the image uniformity problems based on the output of the scan, quantify the image uniformity problems, and bring the problems to the attention of a marking machine user.

In various embodiments of the systems and methods of the invention, this is achieved by measuring a continuous uniform density of at least one test patch, instead of discrete test patches, as in the conventional use of these devices, to provide an image-wise reflectance value as a function of position. Depending on the quality of the image measurement device, positional accuracy of a substrate on which an image is provided with respect to the marking machine may be determined, as well as image uniformity characteristics. Information concerning both image uniformity characteristics and positional accuracy of a substrate on which the image is formed would be useful for many marking system field diagnostic purposes.

In various exemplary embodiments of the invention, image reflectance and/or transmission values as a function of substrate position with respect to a marking machine are analyzed using conventional signal processing algorithms (e.g., Fourier transforms, convolutions with human visual response functions) and compared to product specifications for positional accuracy determinations. In an exemplary embodiment of this invention, an X-Rite® DTP41 spectrophotometer is given a set of command instructions to measure reflectance, then increment the instrument's paper transport motor for 100 milliseconds. X-Rite® provides software called ToolCrib, suitable to this purpose. The process of measurement and paper advancement is repeated until measurements have been gathered over the length of the page. Through use of known transport motor rate or test form fiducial marks, the resulting reflectances are known as a function of position. A fourier transform, applied to the spatial reflectance data will provide the relation of reflectance as a function of spatial frequency. This profile can then be compared to printing system specifications, providing field personnel with a quantified means of demonstrating specification-compliant performance, or identifying the need for additional field service.

In other exemplary embodiments of the invention, evaluation of an image for non-uniformities in one or more selected image component frequency/wavelength bands is also accomplished. The results of such a determination could, for example, lead to a conclusion that non-uniformities in a specific frequency band indicate a damaged gear in the marking machine which created the image that was evaluated.

Once a specific image problem has been determined, field personnel may implement remediation procedures. These procedures may include, for instance, repairing damaged equipment, generating compensation values or modification profiles to apply to the original image data such that the error in the printed image due to the problem is less apparent.

Because many marking machines complete an image scan cycle in a few seconds, the use of spectrophotometers to provide image non-uniformity and/or variation information enables rapid feedback to field service personnel, which may shorten time to repair, increase up time, and provide a competitive advantage for image quality analysis systems with this capability.

A wide variety of scanning spectrophotometers, colorimeters and densitometers exist; this invention applies to all such devices that are capable of providing transmittance and/or reflectance values of an image as a function of the position of the scan on the image, including portable devices.

The present invention is intended to be implemented by field personnel. Field personnel will implement all service actions that would normally be performed on a marking system.

In various exemplary embodiments of the systems and methods of the invention, for example, a marking systems self-check diagnostics will be performed to place the marking system in its healthiest state in order to optimize the marking system's performance, to the degree that a marking system can be optimized in the field.

Once the marking device has been placed in its healthiest state, field personnel may use a portable workstation to reprogram an image measurement device found in the field, such as a spectrophotometer, and use the reprogrammed device to assess the uniformity of an image produced by the optimized marking system. Once any image non-uniformity characteristics have been determined to exist, field personnel can implement procedures to modify any problems associated with the marking machine that are determined to have caused or contributed to such non-uniformity(ies), such as, for example, a printer or copier, or otherwise alter the image, such that subsequent printed image non-uniformity or variation is less apparent.

The systems and methods of the invention use an image measurement device already found in the marking machine field, in the sense that such tools are available at a marking machine user's level and environment, and use the data generated by the image measurement device to determine the uniformity of an image, using one or more test patches, generate a modification profile if needed to correct any determined non-uniformities, and apply a spatial correction if desired.

The systems and methods according to the present invention quantify image non-uniformity and or variation characteristics so that marking machine errors can be diagnosed, the source of those errors identified, and service procedures performed in a user's environment in an expeditious manner to reduce or eliminate the errors. If, for example, the marking machine uses digital imaging technology, the resultant printed image can then be made a visually smooth and uniform halftone covering a specific area without noticeable streaks, bands, mottle or other visual image non-uniformities.

BRIEF DESCRIPTION OF THE DRAWINGS

The patent or application file for this application contains at least one drawing and/or photograph executed in color. Copies of this patent application publication with color drawings and photographs will be provided by the Office upon request and payment of the necessary fee.

The invention will be described with reference to the following drawings in which like reference numerals refer to like elements and wherein:

FIG. 7 shows a reference/test pattern strip having a uniform density throughout;

FIG. 8 is a graph showing image spatial uniformity of an image reflectance across an image;

DETAILED DESCRIPTION OF PREFERRED EMBODIMENTS

The following detailed description of various exemplary embodiments of reference strip scanning systems capable of providing reflectance as a function of position according to this invention may refer to one type of reference strip scanning system or image measurement device, such as a portable X-Rite® DTP41 spectrophotometer, or one type of substrate to be scanned, such as a sheet. However, it should be appreciated that the principles of this invention as outlined and/or discussed below, can be equally applied to any known or later developed image scanning system or device capable of providing transmission and/or reflectance as a function of position, and any known or later developed substrate, beyond the systems specifically discussed herein.

For simplicity and clarification, the operating principles and design factors of various exemplary embodiments of the systems and methods according to this invention are explained with reference to an exemplary embodiment of a spectrophotometer, such as a X-Rite® DTP41 spectrophotometer. The basic explanation of the operation of the image scanning system, including an image measurement device capable of providing reflectance as a function of position, is provided for the understanding and design of any scanning device such as a spectrophotometer, calorimeter, densitometer or other device containing light emitters and respective photo detectors. Although the systems and methods of this invention are described in conjunction with a spectrophotometer, the systems and methods according to this invention can be used with any known or later developed scanning system capable of providing transmission and/or reflectance as a function of wavelength and position.

The present invention may use a X-Rite® DTP41 color auto scanning spectrophotometer. This type of spectrophotometer is a 24-band color measurement device that generates densitometric, colorimetric, and spectral data of an image. The device is typically interfaced with raster image processors (RIPs), copiers, printers, and proofers using available management software control.

Figure 1:
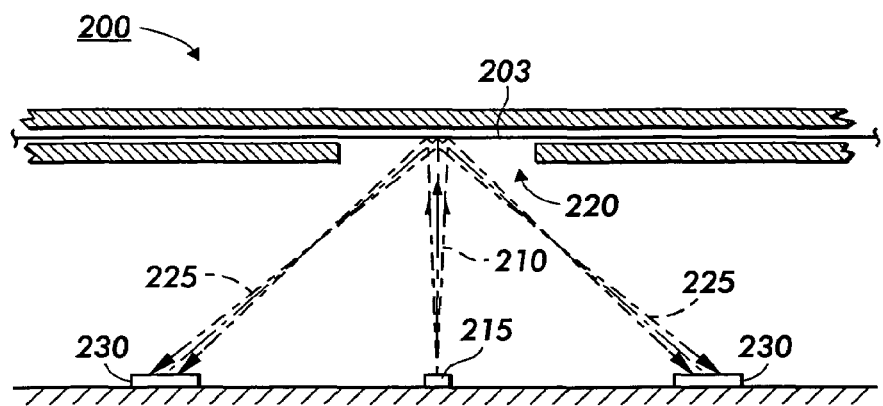
FIG. 1 is a schematic view showing elements of a typical image measurement device.

FIG. 1 is a schematic showing elements of a typical image measurement device 200, such as, for example a spectrophotometer, colorimeter or densitometer. In the exemplary embodiment shown in FIG. 1, a device 200 can illuminate an image (not shown) on a substrate 203 (such as, for example, a reference strip or test pattern) using light beams 210 emitted by at least one LED 215 as the substrate 203 moves past the reference strip scanning area 220. A portion of the light beams 210 is reflected off the area of the image illuminated. These reflected beams 225 are detected by photo detectors 230. Thus, the photo detectors 230 can detect the illumination level of the area of the image illuminated.

Figure 2:
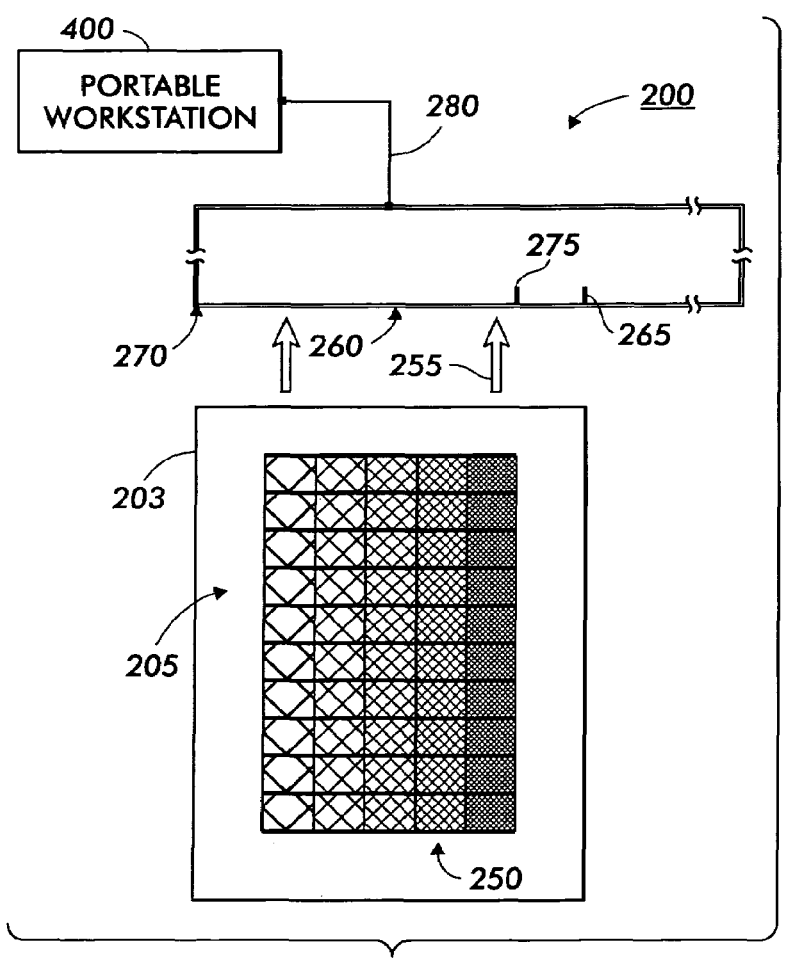
FIG. 2 illustrates one exemplary embodiment of a reference strip scanning system arrangement.
Figure 3:
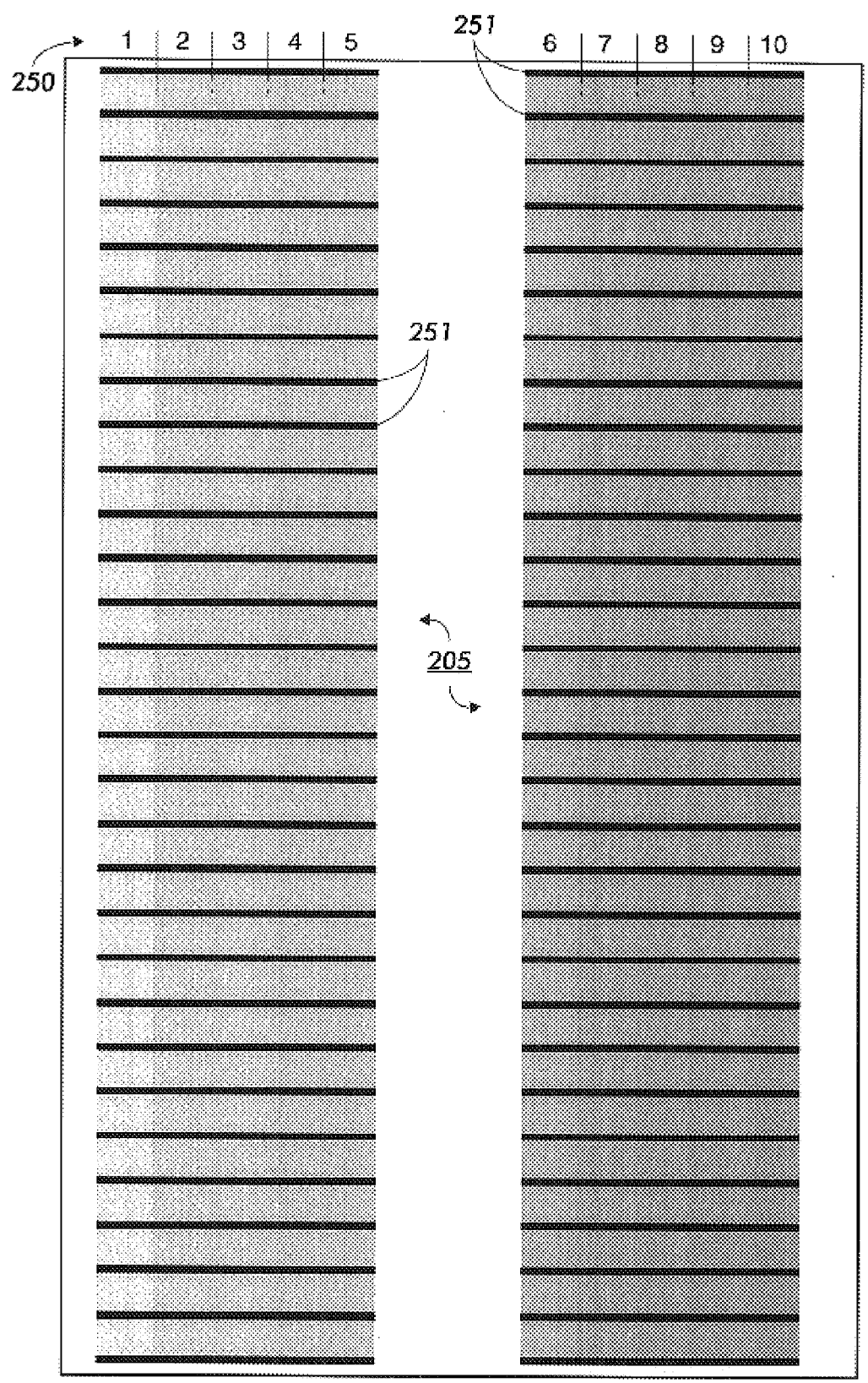
FIG. 3 shows a reference/test pattern strip including monochromatic shades or tint of a single color patch representing density variations for that (cyan) color.
Figure 4:
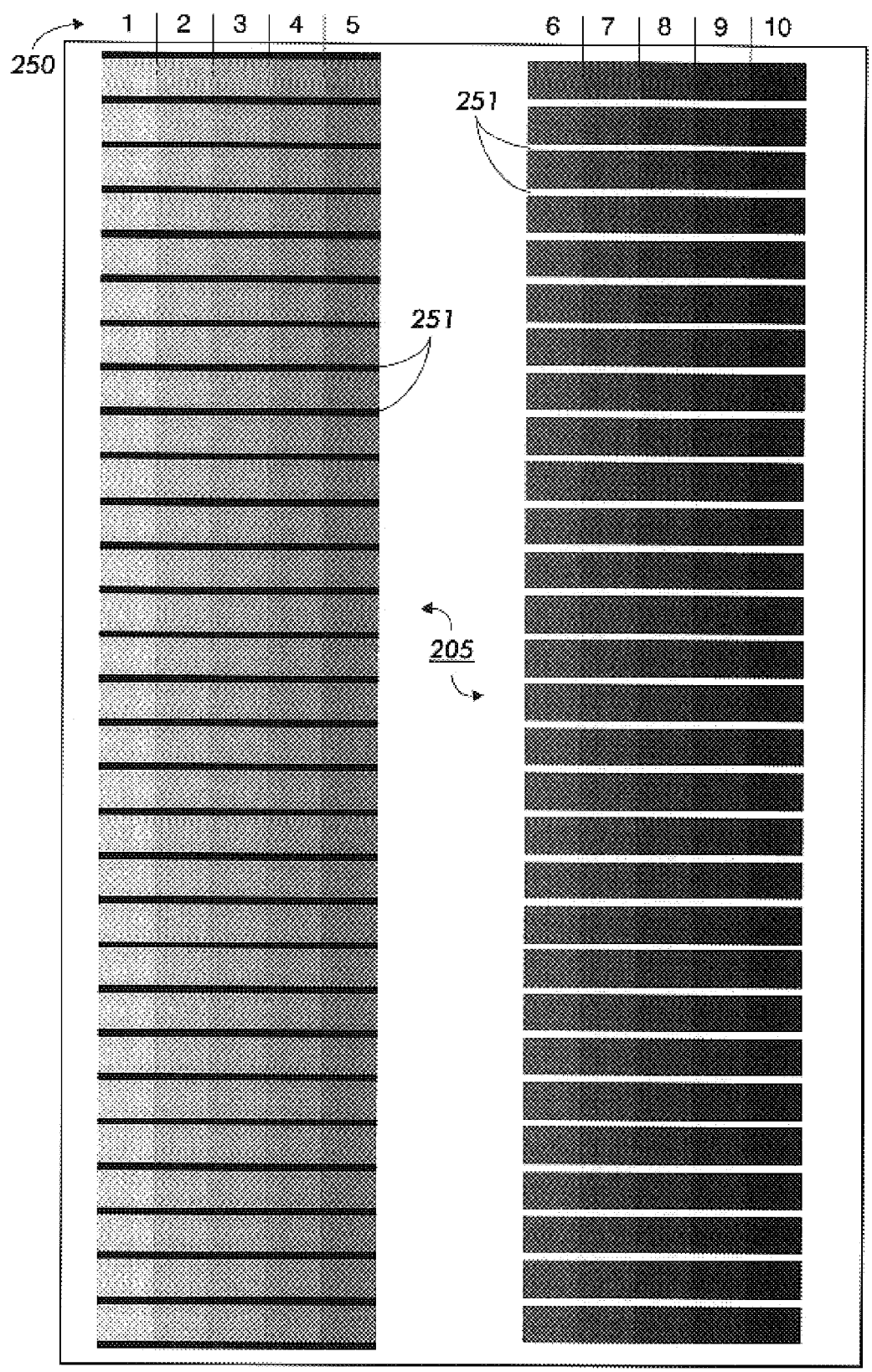
FIG. 4 shows a reference/test pattern strip including shades or tints of gray representing density variations for the gray (achromatic) color.
Figure 5:
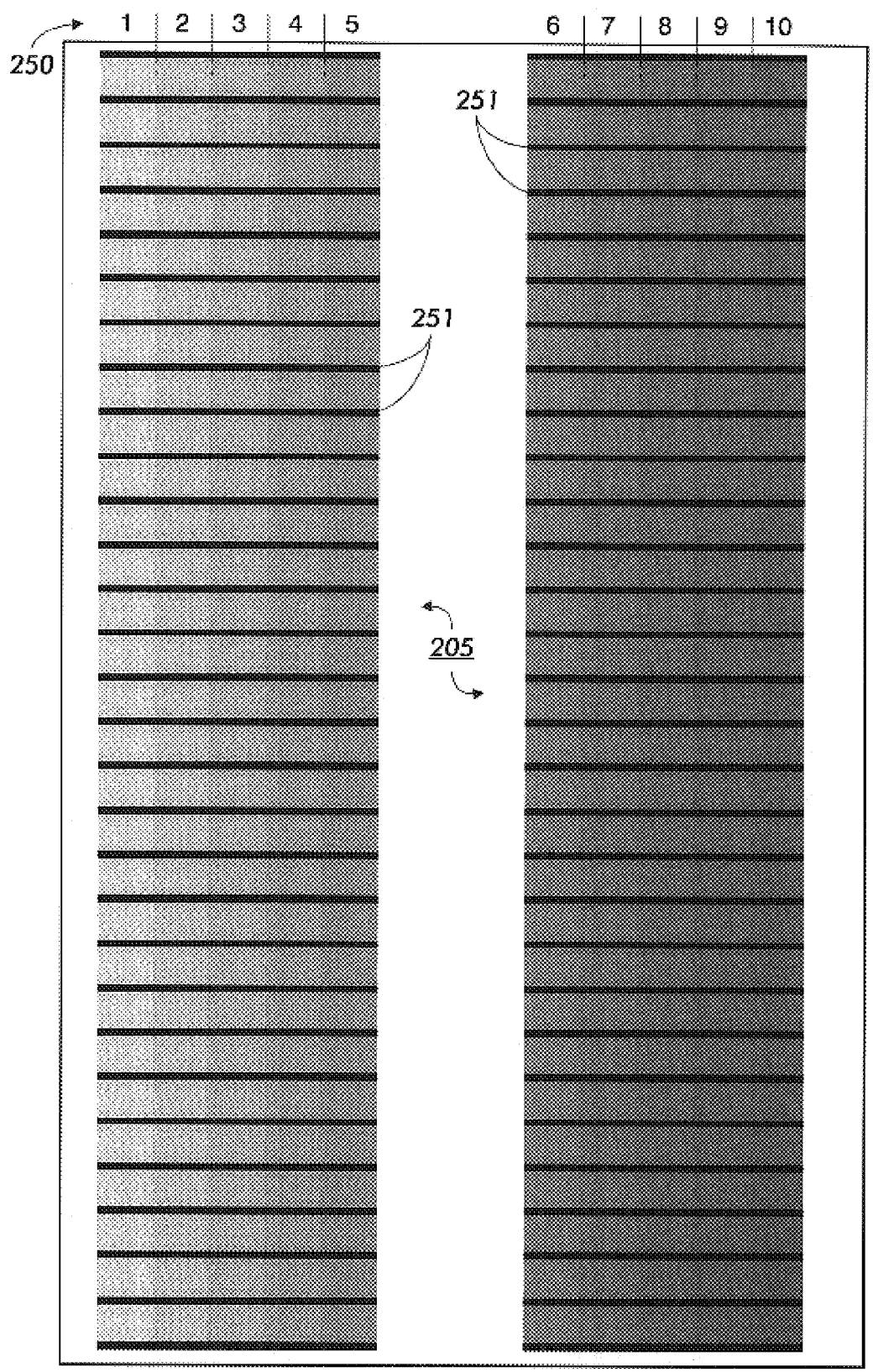
FIG. 5 shows a reference/test pattern strip including monochromatic shades or tint of a single color representing density variations for that (magenta) color.
Figure 6:
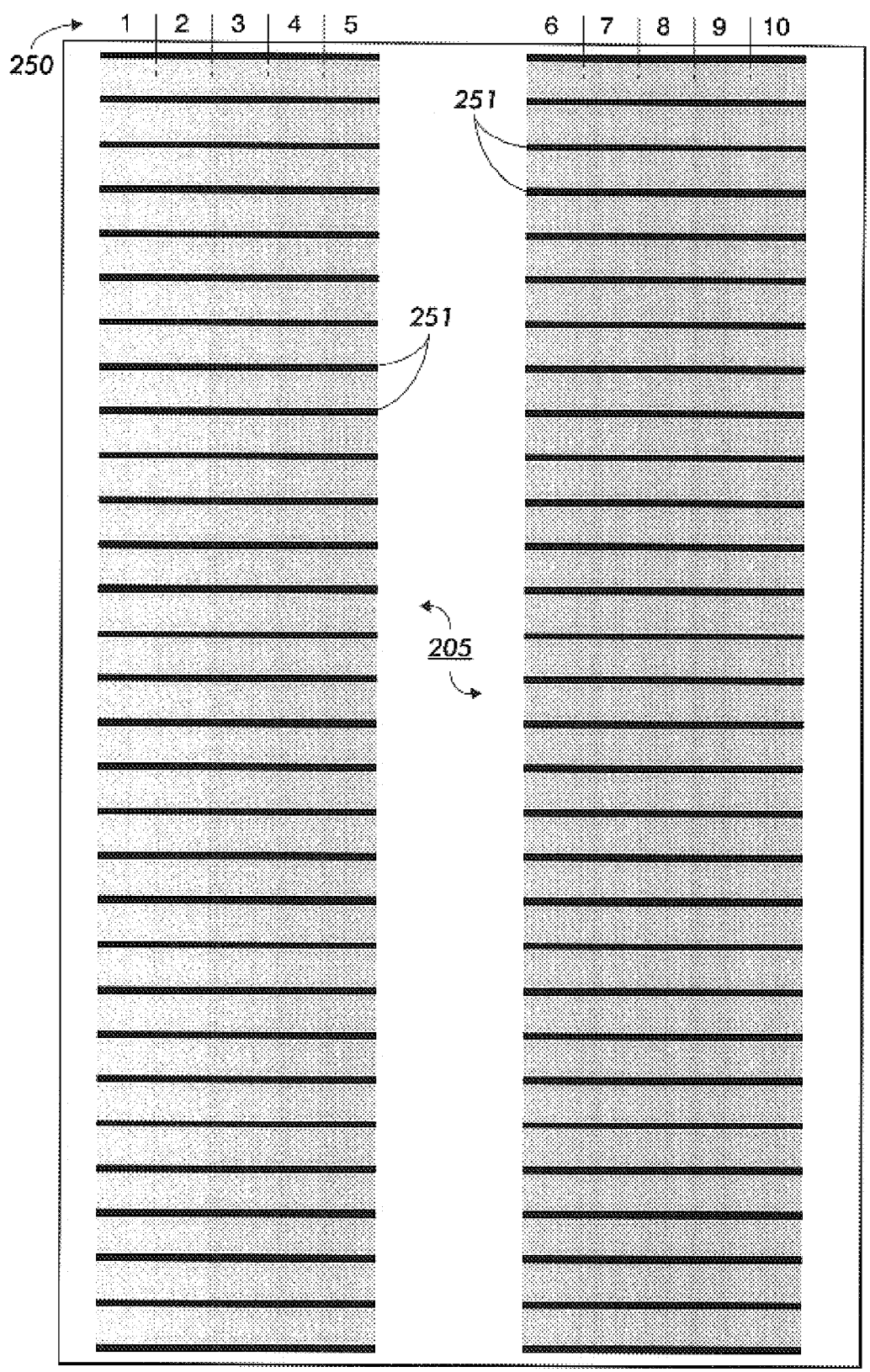
FIG. 6 shows a reference/test pattern strip including monochromatic shades or tints of a single color representing density variations for that (yellow) color.

FIG. 2 shows an exemplary embodiment of an image scanning system that incorporates the systems and methods of the invention. A reference/test pattern 205 containing at least one test patch or strip 250 (an area with a specific tint or call) is inserted in the direction shown by an arrow 255 into the substrate entrance area 260 of the device 200. The device's reference/test pattern entrance area 260 may contain a specific optical maximum distance or width within which an area of the substrate 203 may be scanned. This distance, defined by the distance between marks 265 and 270, corresponds to the width of the substrate that may be scanned by the device 200. The device 200 may also have idle rollers and drive wheels (not shown) to move the reference strip through the device 200 and other features, such as an alignment mark 275, for aligning the end of the reference/test pattern 205, for example, as the reference strip is inserted into the device 200.

FIGS. 3-6 show reference/test patterns 205 which may be used in various exemplary embodiments of the present invention. The reference/test patterns 205 shown in FIG. 3-FIG. 6 may be used to calibrate the output color of an image measurement device 200. The reference/test patterns 205 of FIG. 3-FIG. 6 are relatively identical accept for the color.

Each reference/test pattern 205 shown in the exemplary embodiments FIG. 3-FIG. 6 illustrate multiple columns of a single uniform color density test patches 250. Each column is a test patch or strip 250 of a particular uniform density. Each column 250, delineated by numerals 1-10, has a specific uniform density. Between each row, and thus between each test patch column 250, is a demarcation line 251 which, typically is white or black. Lines 251 are used by the X-Rite® DTP41 color auto scanning spectrophotometer when scanning a test pattern 205, however field use spectrophotometers and/or calorimeters and/or densitometers may not use such lines or need to use such lines. Accordingly, use of such demarcation lines is not required by the systems and methods according to the present invention. In the exemplary embodiments shown, the row of each reference/test pattern 205, contains five test patches or strips 250 of the same color but different uniform densities. In the exemplary embodiments shown, the density of each test patch or strip 250 increases as the row progresses from outboard to inboard, or from left to right. In the exemplary embodiments shown, FIG. 3's test patterns have a cyan color, FIG. 4's test patterns have a gray color, FIG. 5's test patterns have a magenta color and FIG. 6's test patterns have a yellow color.

FIG. 7 is an exemplary embodiment of a reference/test pattern 205 containing only a single test patch or strip of a particular density 250. This test patch 250 may have a length and width less than or up to and including the length and width of an entire image to be scanned.

As the reference/test pattern 205, shown in FIG. 2, is inserted into the substrate entrance area 260, the reference/test patch or strip 250 of the reference/test pattern 205 is scanned by the image measurement device 200. The test patch 250 is scanned as the reference/test patch or strip is inserted and subsequently fed leading edge to trailing edge into the substrate entrance area 260 of the device 200.

In various exemplary embodiments, scanning may be achieved by having at least one light emitter emit light onto the reference/test pattern 205 being scanned. A percentage of light incident on the reference/test pattern 205 is reflected off the reference/test pattern 205, including the reference/test patch or strip 250 contained on the reference/test pattern 205, and received by one or more photo detectors 230 contained within the device 200. The percentage of light reflected by the reference/test pattern 205 to the photo detectors 230 is generally referred to as the reflectance of the reference/test pattern 205. The photo detectors 230 generate a signal corresponding to the amount of reflected light received by the photo detectors 230, and send the signal to a utilization device, such as for example, a portable workstation 400, containing a processor, connected to the device 200. The device 200 may be connected to the portable workstation 400, for example, wirelessly, or by a data line or a conventional interconnection cable 280.

The reflectance value is converted into a signal by the photo detectors 230 and may be transmitted to a portable workstation 400 where the amplitude of the signal may be determined. The signal may then be analyzed by the portable workstation 400 and compared with product specifications for spatial behavior. Thus, the portable workstation 400 may analyze the spatial uniformity values generated for each position of the reference/test pattern 205 length as the reference/test pattern 205 is scanned.

Figure 9:
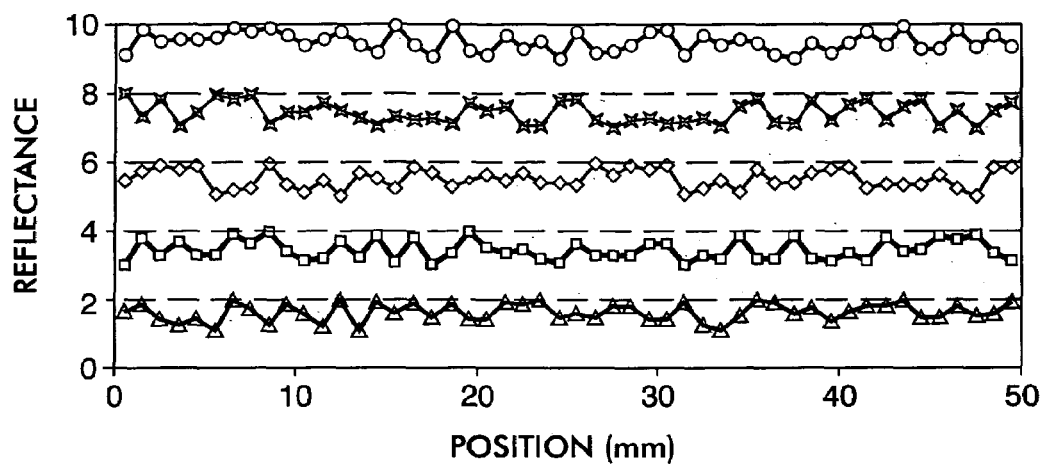
FIG. 9 is a graph showing image spatial uniformity of different images as a function of reflectance values across an image.
Figure 10:
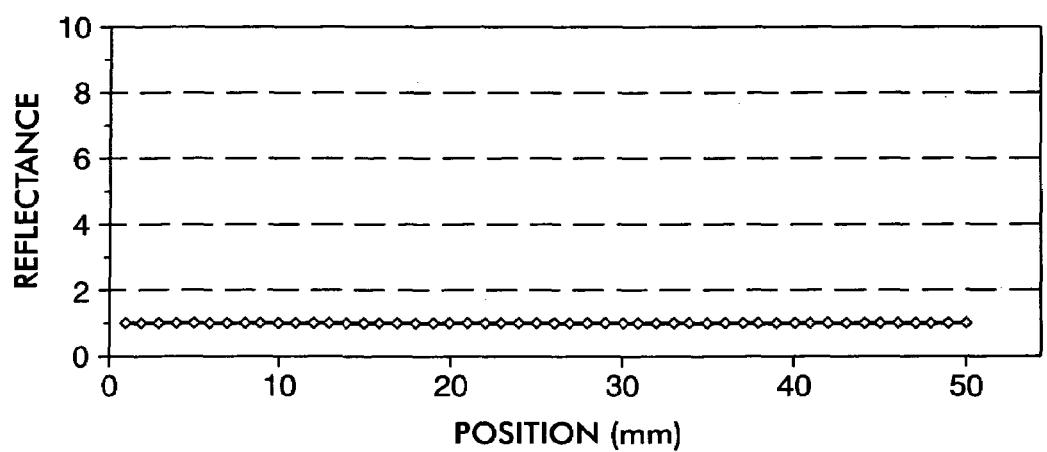
FIG. 10 is a graph showing optimum image spatial uniformity of image reflectance values across an image.

The portable workstation 400 may also create a graph of reflectance versus position. For example, FIG. 8-FIG. 10 are graphs showing the amount of reflectance received from a reference/test strip 250 having a particular density by a photo detector(s) 230 recorded as a function of the scan position of the test strip 250, as the reference/test pattern 205 is scanned. These graphs may be generally referred to as a marking device calibration curve.

The y-axis, of the graphs illustrated by FIG. 8-FIG. 10, shows the percent of light reflectance received by the photo detectors 230. For instance, the number zero represents no amount of reflected light, while the number ten represents that the photo detector 230 receives 10% of the light emitted from the light emitter 215 and incident on the reference/test strip 250 of a particular density. The spikes in the graph coincide with a higher level of reflectance, and thus show where light emitted from the light emitters is reflected at a higher level when compared to other areas of the graph.

The x-axis of the graph shows the position in a scanned image where a respective reflectance value was determined. In the exemplary embodiments of the reference/test patterns shown 205 in FIG. 3-FIG. 6, a reflectance value, shown in FIG. 8-FIG. 10, is generated for each position of the reference test patch or strip 250's length as the reference/test strip or patch 250 is scanned from the reference/test pattern 205's leading edge to its trailing edge. These reflectance and position values may be then used to generate a two-dimensional plot of the spatial uniformity of the reference/test strip or patch 250 along the reference/test strip or patch 250's length. Plots for various reference/test strips or patches are shown in FIG. 8-FIG. 10.

Spatial uniformity may be determined from the reflectance value found for a particular position of a reference/test patch or strip 250 located on a reference/test pattern 205, as the reference/test pattern 205 is scanned.

In the exemplary embodiments of FIG. 8, reflectance values vary from about 5 to 6%. This graph may reflect an average of all strips or of just one of those strips or patches 250. The exemplary embodiment of FIG. 9 shows five different sets of reflectance values one for each of five columns/strips or patches 250 of a reference/test pattern 205.

The exemplary embodiment of FIG. 10 shows a desired completely uniform image density profile with relatively low reflectivity.

As discussed above, for the exemplary embodiments shown in FIG. 3-FIG. 6, a graph, such as shown in FIG. 8, may be generated for each strip or column 250, numbered, for example, 1-5 or 6-10. Thus, as shown in FIG. 9, five sets of data may be graphed because there are five strips or columns 250 numbered 1-5 or 6-10 in the exemplary embodiments. Alternatively, in another exemplary embodiment and as illustrated in FIG. 7, the reference/test pattern 205 could include one test patch 250 the length and width of the area to be scanned or just one column 250 of test pattern 205 can be graphed. In this arrangement, a scan would result in one graph, such as shown in FIG. 8 or FIG. 10. The possibilities of arrangements of one or more test patches or strips 250 is large, so long as the test patch column or strips 250 to be scanned are intended to have identical density values. Moreover, in another exemplary embodiment, for example, the reference/test patch 250 could be arranged in some other grouping, such as in rows.

An ideal scan of a reference/test patch or strip 250 having an identical density value throughout would result in a graph of coordinates sharing the same reflectance value (y-value) and only differing by the position value (x-value) corresponding to each reflectance value. Thus, a scan of a column or strip 250 of high density, such as column 9 of the exemplary embodiments shown in FIG. 3-FIG. 6, would result in a graph of a horizontal line near the low end of the reflectance scale. A horizontal line would indicate that the uniformity of an image (such as a reference strip or reference/test patch 250) is the same at each position the image was scanned, as shown, for example in FIG. 10.

Figure 11:
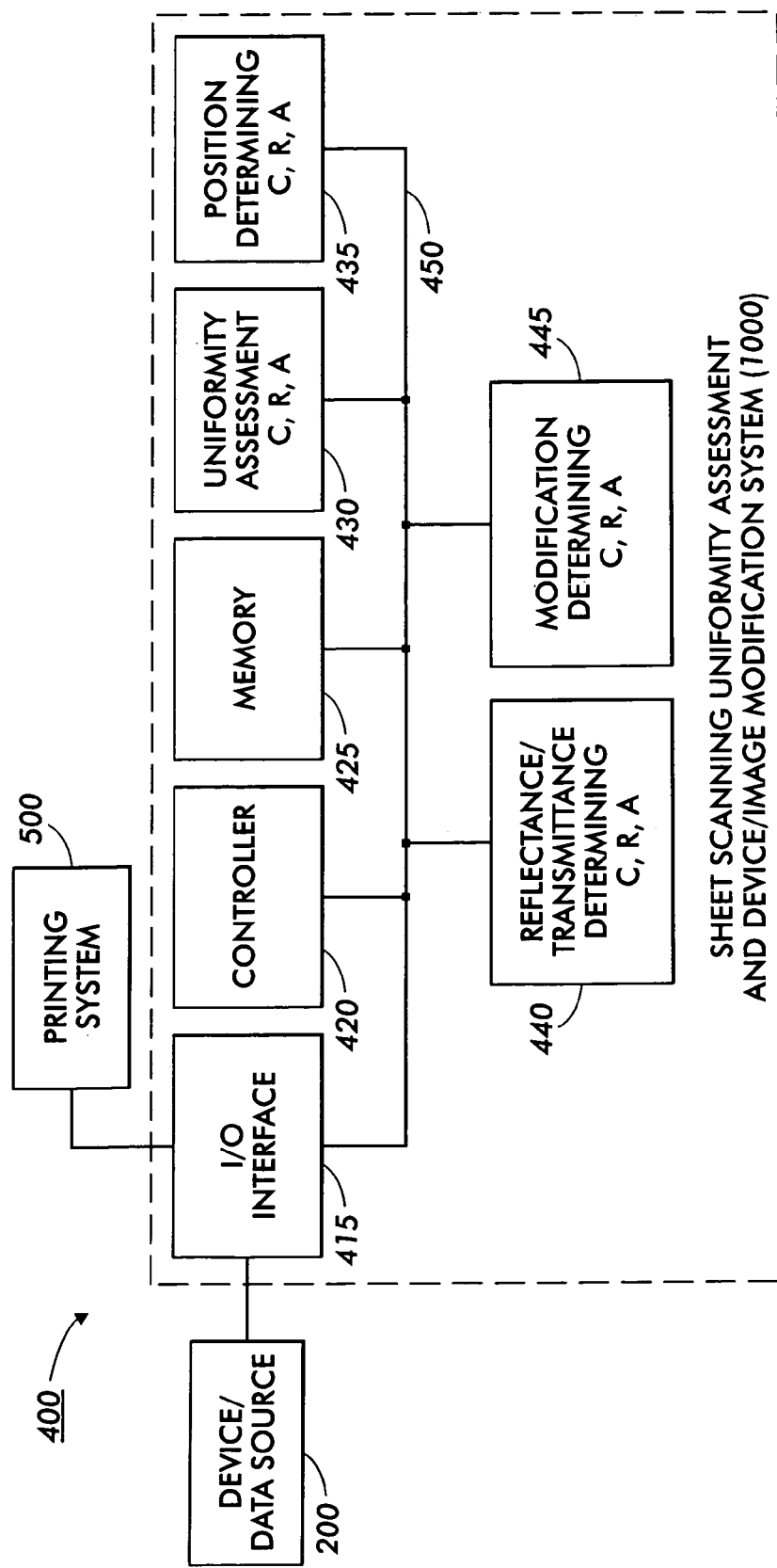
FIG. 11 is a block diagram of an exemplary reference strip scanning uniformity assessment and device/image modification system according to this invention.

FIG. 11 shows one exemplary embodiment of a reference strip scanning uniformity assessment and image modification system 1000 that controls uniformity assessment and device/image modification according to this invention. This system may be housed in a portable workstation 400. As shown in FIG. 11, the reference strip scanning uniformity assessment and modification system 1000 includes an input/output interface 415, a controller 420, a memory 425, a uniformity assessment circuit, routine or application 430, a position determining circuit, routine or application 435, a reflectance and/or transmittance determining circuit, routine or application 440, and a modification determining circuit, routine, or application 445 interconnected by one or more control and/or data buses and/or application programming interfaces 450.

As shown in the exemplary embodiment of FIG. 11, the reference strip scanning and uniformity assessment and modification system 1000 is, implemented on a programmed portable workstation 400 containing a processor. However, in various other exemplary embodiments of the invention, the reference strip scanning uniformity assessment and modification system 1000 may be implemented on a general purpose computer, a special purpose computer, a programmed microprocessor or micro controller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 12, can be used to implement the reference strip scanning and uniformity assessment and modification system 1000.

In the exemplary embodiment of FIG. 11, alterable portions of the memory 425 are implemented using static or dynamic RAM. However, in other exemplary embodiments, the memory 425 may be implemented using a floppy disk and disk drive, a writable optical disk and disk drive, a hard drive, a flash memory or the like. In the exemplary embodiment of FIG. 11, the generally static portions of the memory 425 are implemented using ROM. However, in other exemplary embodiments, the static portions can also be implemented using other non-volatile memory, such as PROM, EPROM, EEPROM, an optical ROM disk, such as a CD-ROM or DVD ROM, and disk drive, flash memory or other alterable memory, as indicated above or the like.

It should be understood that each of the circuits, routines, applications, or elements shown in FIG. 11 could be implemented as portions of a suitably programmed portable workstation 400. Alternatively, each of the circuits, routines, applications, objects or managers shown in FIG. 11 can be implemented as physically distinct hardware circuits within an ASIC, using a digital signal processor (DSP), using a FPGA, a PLD, a PLA and/or a PAL, or using discrete logic elements or discrete circuit elements.

The particular form of the circuits, routines, applications, objects or managers shown in FIG. 11 will take is a design choice and will be obvious and predictable to those skilled in the art. It should be appreciated that the circuits, routines, applications, or other elements shown in FIG. 11 do not need to be of the same design.

Further, it should be appreciated that the programming interfaces 450 connecting the memory 425 to the processor can be a wired or a wireless link to a network. The network can be a local area network, a wide area network, an intranet, the Internet, or any other distributed processing and storage network.

The image data source providing image data signals to the printing or copying system can be a video camera or other source of image data that is capable of providing image data to the I/O interface. The image source may also be any one of a number of other image data sources, such a scanner, a digital camera, a digital copier or facsimile machine device, that is suitable for generating electronic image data, or a device suitable for storing and/or transmitting electronic image data, such as a client or server of a network.

The marking system 500 is connected by a data line to an image device/data source 200. The image device/data source 200, as discussed above, can be any other known or related developed device for generating chromatic or achromatic (monochrome) color image data, such as a spectrophotometric and/or calorimetric and/or color densitometric device.

It should also be appreciated that, while the electronic image data can be generated at the time of printing an image from an original physical document, the electronic image data could have been generated at any time in the past. Moreover, the electronic image data need not have been generated from the original physical document, but could have been created from scratch electronically. The image data source is thus any known or later developed device, which is capable of supplying electronic image data over the link to the image processing apparatus. The link can thus be any known or later developed system or device for transmitting the electronic image data from the image data source to the image printing system.

In general, the systems and methods of image uniformity determination and correction are employed with marking devices which have been optimized using normal service procedures. In other words, the systems and methods of this invention are typically employed to obtain an indication of the inherent image spatial nonuniformities of a marking device and to adjust and/or modify and/or correct those nonuniformities to achieve an image having minimal spatial nonuniformity.

For example, in electrophotographic marking devices, the systems and methods according to this invention would typically be used after the systems built-in self diagnostic features have been completed. The systems and methods according to this invention would be used to obtain one or more image spatial uniformity determinations. If the spatial uniformity determinations are not acceptable, then a correction may be made to the xerographic marking devices systems, such, as for example, to one or more components of its raster output scanner (ROS) to compensate for the determined image nonuniformity(ies).

For example, if an image spatial uniformity determination in the form of a graph of the type illustrated in FIGS. 7-10 is obtained for a particular marking device, then the ROS illuminator or reflector elements may be adjusted to achieve a straight line graph. If, for example, the image spatial nonuniformity curve is in the form of a "smile", then the ROS elements may be adjusted to output a "frown" to compensate for the "smile" to result in image spatial uniformity.

Figure 12:
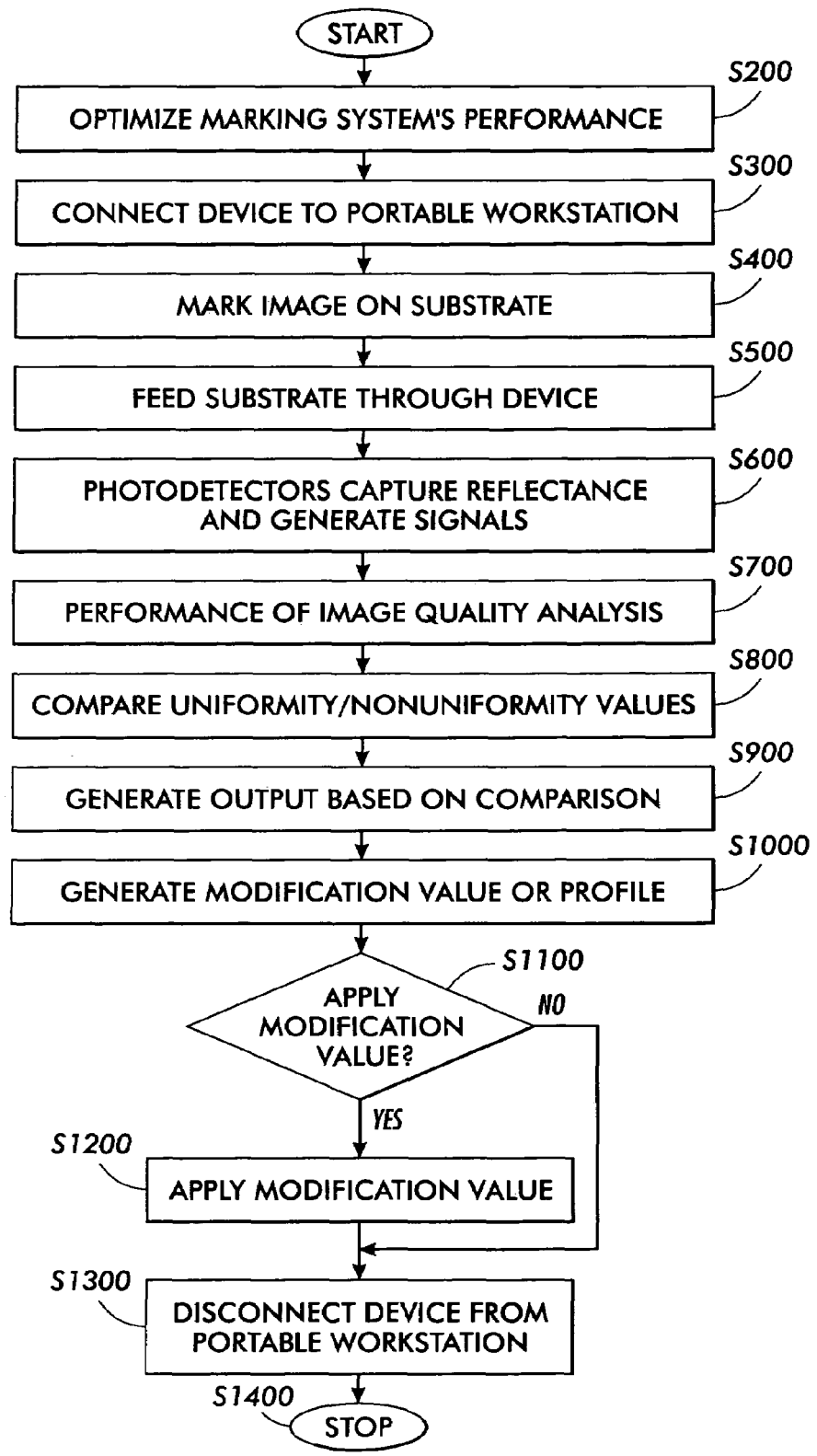
FIG. 12 is a flowchart outlining one exemplary embodiment of a method for using a device to generate uniformity assessment information to adjust machine performance and/or image output.

FIG. 12 is a flowchart outlining one exemplary embodiment of a method for using one or more spectrophotometric and/or colorimetric and/or color densitometric devices to generate uniformity assessment information to adjust marking machine performance or substrate (e.g., reference strip) image output. In step S100, the routine begins. The routine continues to step S1400.

In step S200, a marking system's self-check diagnostics are run. All service actions a field technician would normally perform are also performed on a marking system. The goal of this step is to ensure that all possible procedures, available in the field, to modify the marking system's performance are completed so that the marking system is in its healthiest state and the markings system's performance is optimized. In an exemplary embodiment of the present invention, the following steps are implemented to determine non-uniformities that cannot normally be modified, in the field, using normal service procedures.

In step S300, the marking system's image measurement device, capable of determining image transmittance and/or reflectance as a function of position, is disconnected from the marking system and connected to a portable workstation. The connection of the image measurement device to the portable workstation or other utilization device may be made via a conventional interconnection cable, such as, for example, a serial cable. Then the routine proceeds to step S400.

In step S400, an image, such as multiple reference/test patches, is marked on a substrate, such as a sheet, by the marking system. The routine then proceeds to step S500.

In step S500, the substrate containing the image data is fed through one or more image measurement devices. This device may be a spectrophotometric and/or calorimetric and/or color densitometric device. In this step, as the substrate is fed, the image, such as a test patch corresponding to a tinted area, may be scanned. The invention is not limited to the direction that the substrate is fed or scanned. For instance, much of the above discussed disclosure refers to scanning a substrate, such as a reference strip, from leading edge to trailing edge, however, a substrate may also be scanned from outboard to inboard (from left to right) or in any other scanning direction. Thus, this invention is not limited to the direction of the feed or scan of the substrate.

Next, in step S600, photo detectors, within the image measurement device, capture the level of light reflectance and/or transmittance of light from the image, including the reference/test patch; generate one or more signals proportional to the light level value, as a function of position of the reference/test patch, for each portion of the test patch as the substrate is fed through the device; and send these values to be utilized, such as, for example, by a portable workstation.

Next, in step S700, the utilization device, such as a portable workstation, performs an image quality analysis to determine the existence, amount and spatial distribution of image non-uniformities. The analysis may utilize processing algorithms that correlate the light level value signal(s) with human visual impression of the non-uniformity or variation. Thresholds of human visibility of non-uniformity as a function of spatial frequency are well known in the art. Simple frequency domain representations of non-uniformity, obtained via fourier transforms, can be compared to these thresholds to project observer acceptability.

Then, in step S800, any determined image non-uniformity(ies) are compared with predetermined image uniformity values. Then control proceeds to step S900.

In step S900, the comparison made in step S800 is used to generate an indication of spatial non-uniformities, such as an error value or message, which may, for example, indicate unacceptable image non-uniformities in one or more specific wavelength/frequency bands, and/or generate some other output that would, for example, indicate a cause of unacceptable image characteristics, such as, for example, damage to one or more parts of the marking machine. For example, one or more parts of a raster output scanner, such as the output of a light source, such as an LED, may not have uniform spatial distributions. Alternatively, the error value or message may indicate that a part of a marking machine, such as a gear or LED, is damaged.

Next, in step S1000, a modification value or compensation profile is generated in order to provide an empirical way to compensate for and/or dial-out inherent, residual image non-uniformities. As discussed above, the inherent, residual non-uniformities are the non-uniformities that remain after all normal service actions, including marking machine self-check diagnostics and field technician implemented procedures, are preformed. The modification value or compensation profile may be used during subsequent marking processes, to apply a spatial correction to an image on a local page as an image is produced. For example, as noted above, if a scan reveals that image reflectance as a function of substrate position shows a "smile" profile, such as where image reflectance at the leading and trailing edges of a column of test patches is significantly greater than the image reflectance of test patches located near the center of the column, a compensation profile corresponding to a "frown" could be applied to image data. This compensation profile could then be applied upstream of image marking such that the image data can be modified prior to marking so that the marking machine can generate a more visually uniform image density on the substrate.

Then, control proceeds to step S1100 where a decision is made whether to apply the generated modification value or compensation profile. If so, control proceeds to step S1200, where the modification value or compensation profile is applied to a marking system. If not, control jumps to step S1300.

In step S1300, the one or more image measurement devices are disconnected from the portable workstation and re-connected to the marking system.

Next, in step S1400, the routine ends.

Wile the invention has been described in conjunction with the specific embodiments outline above, it is evident that many alternatives, modifications, and variations, will be apparent to those skilled in the art. For instance, while one skilled in the art of printing systems will apply the systems and methods to printing with ink, or scanning reference strips laden with ink, it is noted that the systems and methods of the invention apply to fluids other than ink. Accordingly, the exemplary embodiments of the invention as set forth above are intended to be illustrative and not limiting. Various charges may be made without departing from the spirit and scope of the invention as described herein.

What is claimed is:

1. An image quality assessment determination method, comprising:
   providing a reference/test image, on a substrate, having at least a portion with an intended uniform optical density;
   determining, with a color measuring device normally usable to determine spectral aspects of a reference/test image, a spatial uniformity of at least one of a transmittance or reflectance of the reference/test image;
   generating image spatial uniformity data based on the spatial uniformity of the at least one of the determined transmittance or reflectance; and
   using the generated spatial uniformity data by at least one of operating a marking engine to modify image spatial uniformity, modifying a marking system that provided the reference/test image or processing an image-forming operation by the marking system that provided the reference/test image based on the generated spatial uniformity data.

2. The method of claim 1, wherein the generated image spatial uniformity data comprises at least image reflectance and a corresponding position value.

3. The method of claim 1, wherein the color measuring device is at least one of a spectrophotometer, a colorimeter, or a densitometer.

4. The method of claim 1, wherein the substrate is a sheet upon which an image is formed.

5. A system for assessing and modifying the image uniformity of images produced by marking systems, having component parts capable of being assembled in the field, the system comprising:

an image measurement device capable of determining, as a function of position, at least one of transmittance r reflectance; and a portable work station, capable of receiving and processing data from the image measurement device, wherein said image measurement device is adapted to determine the spatial uniformity of the at least one of transmittance or reflectance of an image based on an assessment of at least one reference/test image, produced by a marking system, having at least one portion having an intended uniform optical density.

6. The system of claim 5, wherein said image measurement device communicates the determined spatial uniformity to said portable work station; and wherein said portable work station utilizes the determined spatial uniformity by at least one of operating a marking engine to modify image spatial uniformity, modifying a marking system that provided the reference/test image, or modifying subsequent image data.

* * * * *